(12) United States Patent
Chen

(10) Patent No.: US 8,373,995 B2
(45) Date of Patent: Feb. 12, 2013

(54) EXPANSION CARD MOUNTING APPARATUS

(75) Inventor: Yun-Lung Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 12/917,578

(22) Filed: Nov. 2, 2010

(65) Prior Publication Data
US 2011/0310576 A1 Dec. 22, 2011

(30) Foreign Application Priority Data

Jun. 17, 2010 (CN) .......................... 2010 1 0202002

(51) Int. Cl.
*H05K 5/00* (2006.01)
*H05K 7/00* (2006.01)
*A47B 81/00* (2006.01)

(52) U.S. Cl. ........ 361/759; 361/752; 361/755; 361/756; 361/679.32; 361/679.38; 312/223.1; 312/223.2

(58) Field of Classification Search ................. 361/681, 361/683, 679.01, 801, 804, 679.29, 679.55, 361/679.32, 679.43, 679.44, 679.58, 679.59, 361/728–732, 740, 685, 725, 726, 727, 753, 361/759, 816; 16/367, 337, 319, 344, 336, 16/302, 342, 282, 283, 308, 368, 379, 343, 16/330; 312/223.1, 223.2
See application file for complete search history.

(56) References Cited

U.S. PATENT DOCUMENTS

| 2007/0206368 | A1* | 9/2007 | Zhang et al. .................. 361/801 |
| 2009/0154119 | A1* | 6/2009 | Chen et al. .................... 361/759 |
| 2009/0262508 | A1* | 10/2009 | Fukui et al. ................... 361/759 |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An expansion card mounting apparatus includes an enclosure, a slot cover of an expansion card, and a retaining member. The enclosure includes a side wall which defines an expansion card slot. A support plate is formed on the side wall and located above the slot. The slot cover includes a fixing portion. A recess is defined in the fixing portion. The slot cover shields the expansion card slot with the fixing portion placed on the support plate. The retaining member is pivotably mounted on the side wall. The retaining member includes a pressing plate and a boss formed on the pressing plate. The pressing plate presses the fixing portion on the support plate, and the boss located in the recess.

12 Claims, 5 Drawing Sheets

EXPANSION CARD MOUNTING APPARATUS

BACKGROUND

1. Technical Field

The present disclosure relates to mounting apparatuses, and more particularly to a mounting apparatus for mounting expansion cards in a computer enclosure.

2. Description of Related Art

Many computer systems include not only a motherboard, but also one or more expansion cards that provide specialized functions. Such expansion cards conventionally have been sold with a vertical slot cover along one edge having an outward extending tab. When an expansion card is plugged into pin connectors inside a computer enclosure, the extending tab of the slot cover abuts a support plate formed at a rear panel of the enclosure. A cutout defined in the tab of the slot cover coincides with a hole defined in the support plate. A screw or a bolt is extended through the cutout and engaged in the hole. The slot cover is thus secured to the support plate.

When installing or removing several expansion cards, using fasteners such as screws or bolts is laborious and time-consuming. In addition, a tool such as a screwdriver or a wrench is usually required.

Therefore, there is space for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
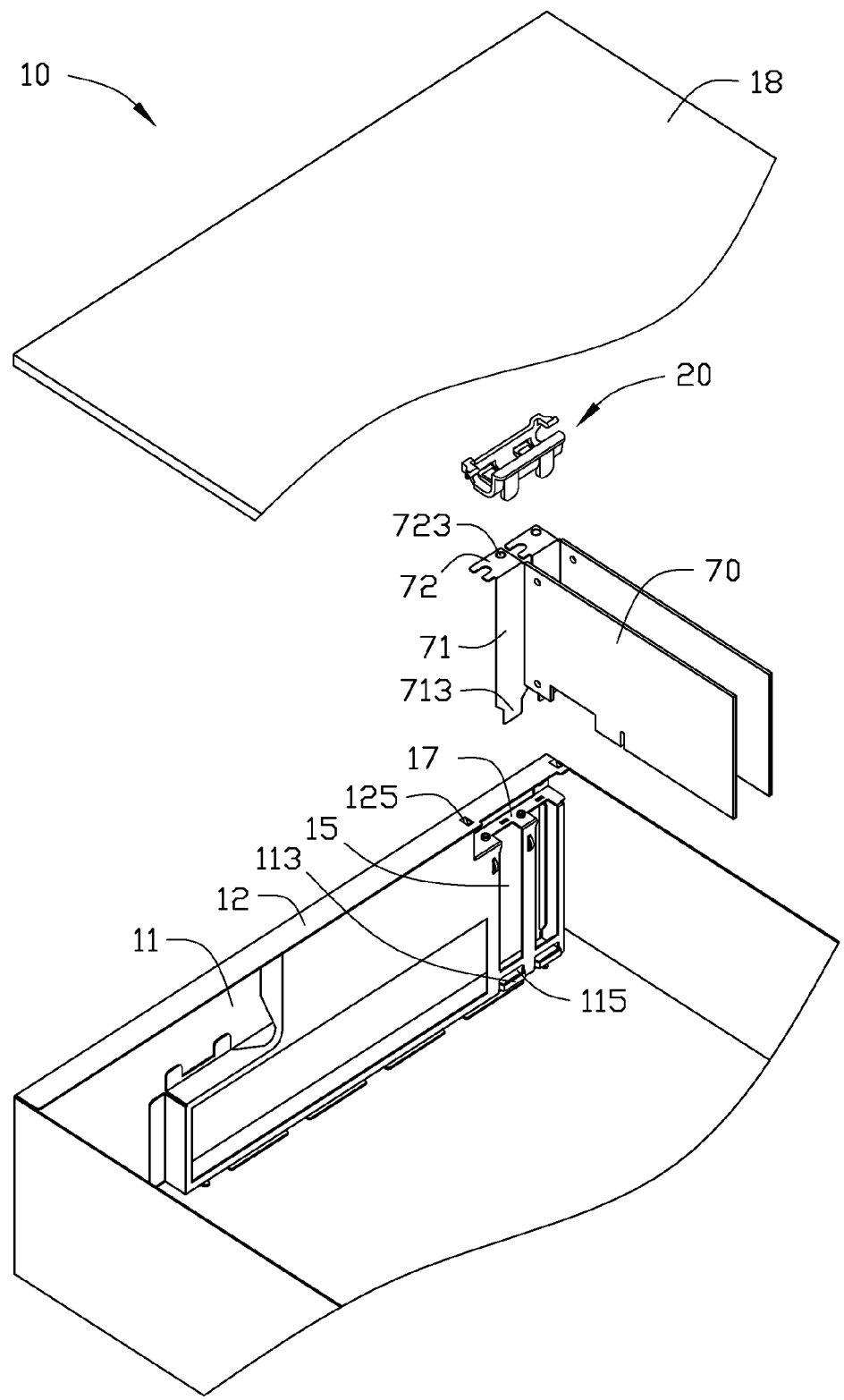
FIG. 1 is an isometric and exploded view of an expansion card mounting apparatus in accordance with an exemplary embodiment.
Figure 2:
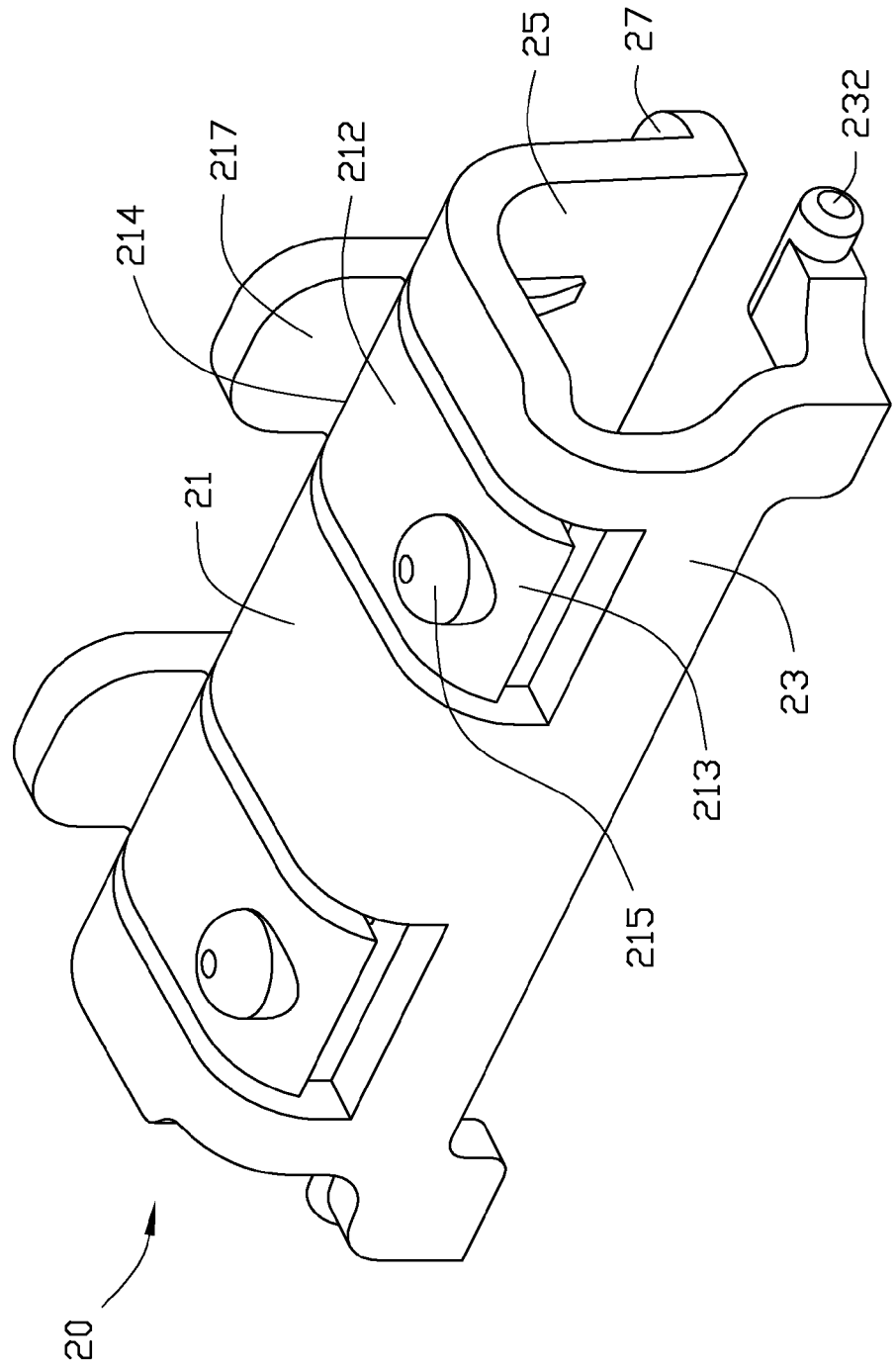
FIG. 2 is an isometric view of a retaining member of the expansion card mounting member of FIG. 1.

Referring to FIGS. 1 and 2, an expansion card mounting apparatus in accordance with an exemplary embodiment includes an enclosure 10 for mounting one or more expansion cards 70 therein.

The enclosure 10 includes a side wall 11, a cover plate 18, and a retaining member 20. The side wall 11 forms a horizontal support plate 17 by stamping a portion of the side wall 11. Juxtaposed and vertical expansion card slots 15 are defined in the support plate 17 and the side wall 11. The side wall 11 includes a limiting piece 113 below each expansion card slot 15. A receiving space 115 is defined between the limiting piece 113 and the side wall 11. A top edge of the side wall 11 can be perpendicularly bent to form a flange 12. The flange 12 is stamped downwards to forms a pair of arc pieces A pivot hole 125 is defined between the flange 12 and each arc piece. Each pivot hole 125 extends in a direction parallel to the flange 12.

The retaining member 20 can be formed in an "n" shape. The retaining member 20 includes a pressing plate 21, a first side plate 23, and a second plate 25. The first and second plates 23 and 25 perpendicularly extend from opposite edges of the pressing plate 21. The pressing plate 21 forms elastic pieces 212 corresponding to the expansion card slots 15 of the side wall 11. Each elastic piece 212 includes a first end 214 adjacent to the second side plate 25 and a second end adjacent to the first side plate 23. The first end 214 is connected to the pressing plate 21. The second end is a free end 213. A restricting piece 217 extends in a direction opposite to the second side plate 25. The first side plate 23 forms a pivot shaft 232 corresponding to each pivot hole 125 of the side wall 11. A support piece 27 is formed on the second side plate 25. The restricting piece 217 is perpendicular to the support piece 27.

The expansion card 70 has a slot cover 71 attached to a rear edge thereof. The slot cover 71 has a bent fixing portion 72 at a top end thereof, and an insert portion 713 at a bottom end thereof. A recess 723 is defined in a bent fixing portion 72.

Figure 3:
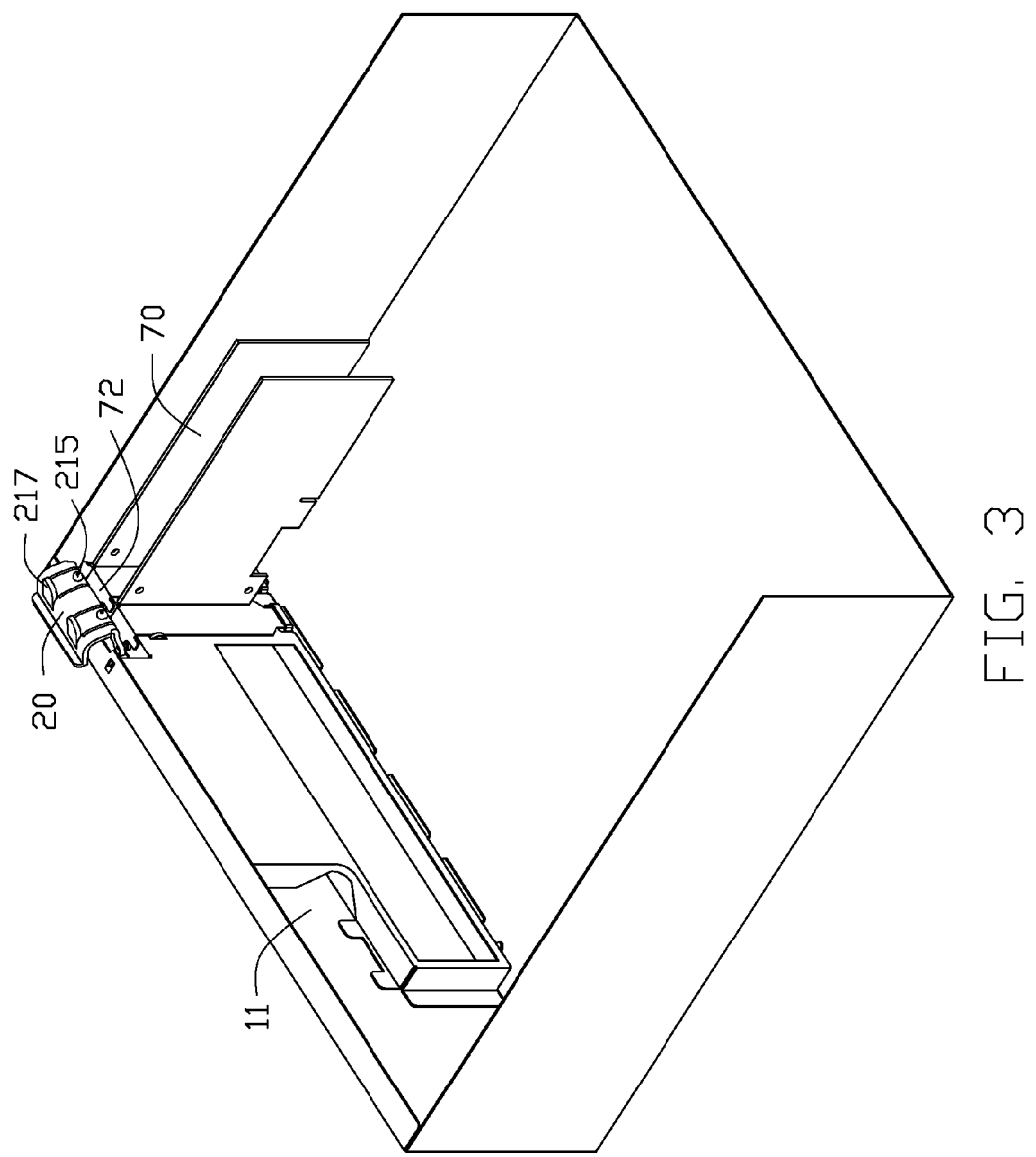
FIG. 3 is a partially assembly view of the expansion card mounting member of FIG. 1.
Figure 4:
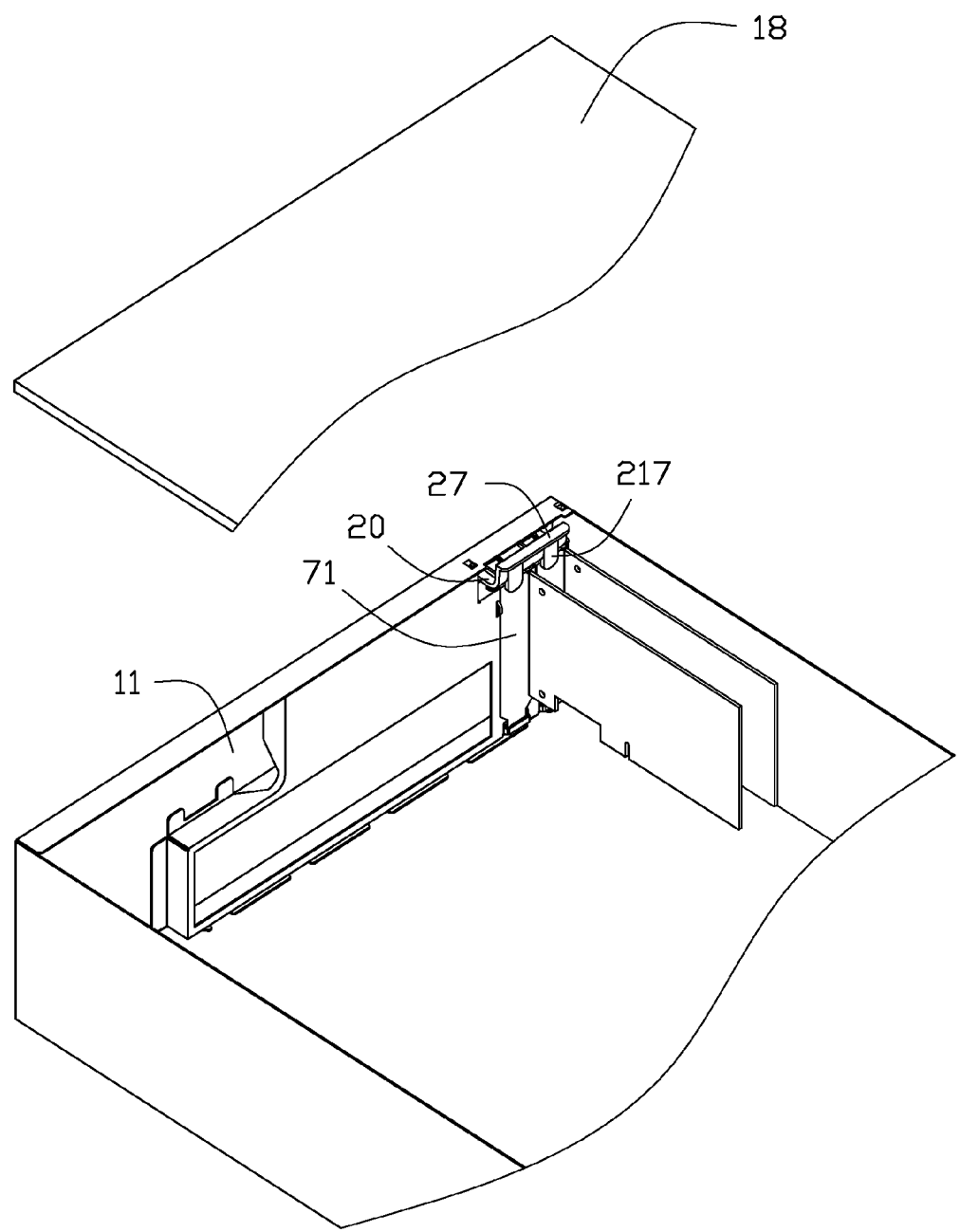
FIG. 4 another partially assembly view of the expansion card mounting member of FIG. 1.
Figure 5:
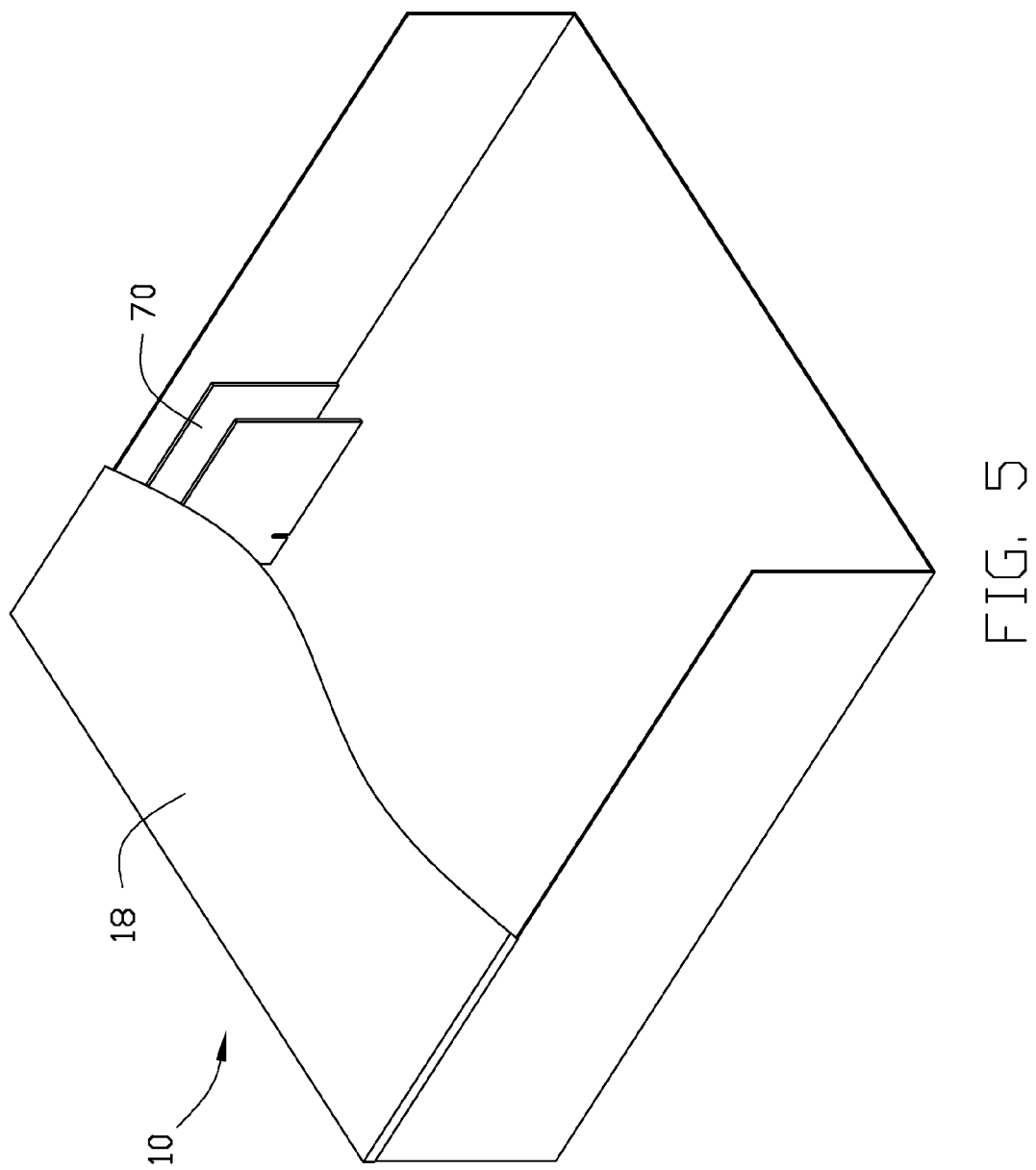
FIG. 5 is an assembly view of the expansion card mounting member of FIG. 1.

Referring to FIGS. 3 to 5, the expansion card 70 is moved towards the side wall 11. The insert portion 713 inserts in the receiving space 115 and sandwiched by the side wall 11 and the limiting piece 113. The fixing portion 72 is placed on the support plate 17. Then, the pair of pivot shafts 232 of the retaining bracket 20 insert into the pivot holes 125 of the side wall 11. Therefore, the retaining member 20 is pivotably mounted on the side wall 11. The retaining member 20 rotates on the side wall 11 to allow the pressing plate 21 to press against the fixing portion 72 of the expansion card 70. One boss 215 of one elastic piece 212 of the retaining bracket 20 is located in the recess 723 of the fixing portion 72. The elastic piece 212 is elastically flexed. At this position, one restricting piece 217 of the retaining bracket 20 abuts the slot cover 71 of the expansion card 70. At last, the cover plate 18 is mounted on the side wall 11 and presses the support piece 27 of the retaining member 20. Therefore, the retaining member 20 can not rotate freely. The expansion card 70 is firmly secured on the side wall 11.

Referring to FIGS. 3 to 5, to disassemble the expansion card 70 from the side wall 11, the cover plate 18 is first detached from the side wall 11. The cover plate 18 does not press support piece 27. The support piece 27 rotates to have the pressing plate 21 not press against the fixing portion 72 of the expansion card 70. Therefore, the expansion card 70 can be detached from the side wall 11.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An expansion card mounting apparatus, comprising: an enclosure comprising a side wall, the side wall defining an expansion card slot, a support plate connected to the side wall and located above the slot;

a slot cover of an expansion card, the slot cover comprising a fixing portion, a recess defined in the fixing portion;

wherein the slot cover shields on the expansion card slot with the fixing portion placed on the support plate; and a retaining member pivotably mounted on the side wall, the retaining member comprising a pressing plate, the pressing plate comprising an elastic piece and a boss, the elastic piece comprising a free end, the boss being on the free end, wherein the pressing plate abuts the fixing portion and is elastically deformed by the fixing portion, and the boss is located in the recess; and a first side plate is perpendicularly connected to a first edge of the pressing plate that is adjacent to the free end of the elastic piece; and a second side plate is perpendicularly connected to a second edge of the pressing plate that is adjacent to a connecting portion of the pressing plate and the elastic piece; and a cover plate is attached on the enclosure and located on a support piece connected to the second side plate to prevent the retaining member rotating freely.

2. The expansion card mounting apparatus of claim 1, wherein a pair of pivot shafts are connected to the first side plate, the side wall defines a pair of pivot holes, and the pair of pivot shafts are inserted in the pair of pivot holes to pivotably mount the retaining member on the side wall.

3. The expansion card mounting apparatus of claim 2, wherein a flange is connected to the side wall, the pair of pivot holes is defined in the flange, and the pair of pivot holes extends in a direction parallel to the flange.

4. The expansion card mounting apparatus of claim 1, wherein a restricting piece is connected to the connecting portion of the pressing plate and the elastic piece, the restricting piece and the second side plate are connected to the connecting portion in opposite direction, and the restricting piece abuts the slot cover.

5. The expansion card mounting apparatus of claim 4, wherein the restricting piece is perpendicular to the support piece.

6. The expansion card mounting apparatus of claim 1, wherein a bottom end of the slot cover has an insert portion, a limiting piece is located on the side wall below the expansion card slot, a receiving space is defined between the limiting piece and the side wall, and the insert portion is inserted in the receiving space.

7. An expansion card mounting apparatus, comprising: an enclosure comprising a side wall, the side wall defining an expansion card slot, a support plate formed on the side wall;

a slot cover of an expansion card, the slot cover comprising a fixing portion, wherein the slot cover shields the expansion card slot with the fixing portion placed on the support plate; and a retaining member pivotably mounted on the side wall, the retaining member comprising a pressing plate and a restricting piece; wherein the pressing plate is configured to press the fixing portion on the support plate, and the restricting piece is configured to abut the slot cover; the pressing plate comprises an elastic piece and a boss, the elastic piece comprises a free end, the boss being on the free end, the pressing plate abuts the fixing portion and is elastically deformed by the fixing portion, the fixing portion defines a recess, and the boss is located in the recess; and a first side plate is perpendicularly connected to a first edge of the pressing plate that is adjacent to the free end of the elastic piece; and a second side plate is perpendicularly connected to a second edge of the pressing plate that is adjacent to a connecting portion of the pressing plate and the elastic piece; and a cover plate is attached on the enclosure and located on a support piece connected to the second side plate to prevent the retaining member rotating freely.

8. The expansion card mounting apparatus of claim 1, wherein a pair of pivot shafts are connected to the first side plate, the side wall defines a pair of pivot holes, and the pair of pivot shafts are inserted in the pair of pivot holes to pivotably mount the retaining member on the side wall.

9. The expansion card mounting apparatus of claim 8, wherein a flange is connected to the side wall, the pair of pivot holes is defined in the flange, and the pair of pivot holes extends in a direction parallel to the flange.

10. The expansion card mounting apparatus of claim 7, wherein the restricting piece is connected to the connecting portion of the pressing plate and the elastic piece, the restricting piece and the second side plate are connected to the connecting portion in opposite direction.

11. The expansion card mounting apparatus of claim 10, wherein the restricting piece is perpendicular to the support piece.

12. The expansion card mounting apparatus of claim 7, wherein a bottom end of the slot cover has an insert portion, a limiting piece is located on the side wall below the expansion card slot, a receiving space is defined between the limiting piece and the side wall, and the insert portion is inserted in the receiving space.

* * * * *